US011861358B2

(12) United States Patent
Teisberg et al.

(10) Patent No.: US 11,861,358 B2
(45) Date of Patent: *Jan. 2, 2024

(54) FIRMWARE UPDATE OF AN INTERCONNECT DEVICE

(71) Applicant: Hewlett Packard Enterprise Development LP, Houston, TX (US)

(72) Inventors: Robert Teisberg, Austin, TX (US); David Koenen, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,584

(22) Filed: Jun. 29, 2022

(65) Prior Publication Data

US 2022/0326937 A1 Oct. 13, 2022

Related U.S. Application Data

(63) Continuation of application No. 15/749,032, filed as application No. PCT/US2015/043026 on Jul. 30, 2015, now Pat. No. 11,379,208.

(51) Int. Cl.
*G06F 8/65* (2018.01)
*H04L 41/082* (2022.01)
(Continued)

(52) U.S. Cl.
CPC ............ *G06F 8/65* (2013.01); *G06F 13/1673* (2013.01); *G06F 13/4022* (2013.01);
(Continued)

(58) Field of Classification Search
CPC .... G06F 8/65; G06F 13/1673; G06F 13/4022; H04L 41/082; H04L 45/28; H04L 45/563;
(Continued)

(56) References Cited

U.S. PATENT DOCUMENTS 7,032,218 B2   4/2006   Shirasawa et al.
7,225,240 B1   5/2007   Fox et al.
(Continued)

OTHER PUBLICATIONS

McGowan, Paul, "How to Update Bridge Firmware", available online at <psaudio.com/ps_how/how-to-update-bridge-firmware/>, May 2, 2014, 6 pages.
(Continued)

*Primary Examiner* — S. Sough
*Assistant Examiner* — Zheng Wei
(74) *Attorney, Agent, or Firm* — Slater Matsil, LLP

(57) ABSTRACT

An example device includes a processor; a first interface port forming a first datalink to a core network device via a first interconnect device; and a second interface port forming a second datalink to the core network device via a second interconnect device, the first and second datalinks being redundant connections of a link aggregation group (LAG) including a plurality of multiplexed connections within a single network media. The processor is to: remove the first interconnect device while maintaining the second datalink; update firmware of the first interconnect device upon receiving a first indication that the first interconnect device has stopped receiving or transmitting data; and reestablish the redundant connections of the first interconnect device upon receiving a second indication that the first interconnect device has been added back to the LAG. The first and second indications include indications of states in each connection of the multiplexed connections.

20 Claims, 4 Drawing Sheets

(51) Int. Cl.
| | |
|---|---|
| *H04L 67/00* | (2022.01) |
| *H04L 69/14* | (2022.01) |
| *H04L 45/00* | (2022.01) |
| *H04L 67/145* | (2022.01) |
| *H04L 45/28* | (2022.01) |
| *H04L 69/40* | (2022.01) |
| *G06F 13/16* | (2006.01) |
| *G06F 13/40* | (2006.01) |

(52) U.S. Cl.
CPC ............ *H04L 41/082* (2013.01); *H04L 45/28* (2013.01); *H04L 45/563* (2013.01); *H04L 67/145* (2013.01); *H04L 67/34* (2013.01); *H04L 69/14* (2013.01); *H04L 69/40* (2013.01); *Y02D 30/50* (2020.08)

(58) Field of Classification Search
CPC ....... H04L 67/145; H04L 67/34; H04L 69/14; H04L 69/40
See application file for complete search history.

(56) References Cited

U.S. PATENT DOCUMENTS

| | | | |
|---|---|---|---|
| 7,430,735 | B1 | 9/2008 | Balakrishnan et al. |
| 8,209,403 | B2 | 6/2012 | Szabo et al. |
| 8,219,794 | B1 | 7/2012 | Wang et al. |
| 8,243,594 | B1 | 8/2012 | Fotedar et al. |
| 8,346,860 | B2 | 1/2013 | Berg et al. |
| 8,402,454 | B2 | 3/2013 | Wang et al. |
| 8,418,166 | B2 | 4/2013 | Armstrong et al. |
| 8,495,618 | B1 | 7/2013 | Inbaraj et al. |
| 8,499,060 | B2 | 7/2013 | Narayanan et al. |
| 8,621,054 | B2 | 12/2013 | Maruyama et al. |
| 8,730,963 | B1 | 5/2014 | Grosser et al. |
| 8,943,490 | B1 | 1/2015 | Jain et al. |
| 8,966,101 | B2 | 2/2015 | Thiyagarajan |
| 8,966,466 | B2 | 2/2015 | Tiwari et al. |
| 9,088,584 | B2 | 7/2015 | Feng et al. |
| 9,092,223 | B1 | 7/2015 | Pani et al. |
| 9,141,373 | B2 | 9/2015 | Capper |
| 9,258,135 | B2 | 2/2016 | Ramanathan et al. |
| 9,444,741 | B2 | 9/2016 | Agarwal et al. |
| 9,606,789 | B2 | 3/2017 | Muroyama et al. |
| 9,632,884 | B2 | 4/2017 | Bittles et al. |
| 9,866,445 | B2 | 1/2018 | Douville et al. |
| 10,049,070 | B2 * | 8/2018 | Cao ...................... G06F 13/385 |
| 2002/0006110 | A1 | 1/2002 | Brezzo et al. |
| 2003/0177209 | A1 | 9/2003 | Kwok et al. |
| 2004/0024853 | A1 | 2/2004 | Cates et al. |
| 2007/0025253 | A1 | 2/2007 | Enstone et al. |
| 2007/0110087 | A1 | 5/2007 | Abel et al. |
| 2007/0174686 | A1 | 7/2007 | Douglas et al. |
| 2007/0234332 | A1 | 10/2007 | Brundridge et al. |
| 2007/0244999 | A1 | 10/2007 | Hamanaka et al. |
| 2009/0080332 | A1 * | 3/2009 | Mizrachi ................ H04L 47/10 370/236 |
| 2010/0042869 | A1 * | 2/2010 | Szabo ..................... G06F 8/656 717/171 |
| 2010/0162223 | A1 | 6/2010 | Hattori et al. |
| 2010/0293408 | A1 | 11/2010 | Shannon et al. |
| 2011/0035741 | A1 | 2/2011 | Thiyagarajan |
| 2011/0231833 | A1 | 9/2011 | Narayanan et al. |
| 2012/0072893 | A1 | 3/2012 | Gupta et al. |
| 2012/0072894 | A1 | 3/2012 | Wang et al. |
| 2012/0179932 | A1 | 7/2012 | Armstrong et al. |
| 2013/0155902 | A1 | 6/2013 | Feng et al. |
| 2014/0059530 | A1 | 2/2014 | Banavalikar et al. |
| 2014/0101653 | A1 | 4/2014 | Dharmadhikari et al. |
| 2014/0189337 | A1 * | 7/2014 | Lin .......................... G06F 8/65 713/2 |
| 2014/0259000 | A1 | 9/2014 | Desanti et al. |
| 2015/0169418 | A1 | 6/2015 | Cardona et al. |
| 2015/0271244 | A1 | 9/2015 | Bloch et al. |
| 2016/0094436 | A1 * | 3/2016 | Elder .................... H04L 45/245 370/225 |
| 2016/0212056 | A1 | 7/2016 | Grosso et al. |
| 2016/0313985 | A1 | 10/2016 | Sprygada et al. |
| 2017/0031602 | A1 | 2/2017 | Xu et al. |

OTHER PUBLICATIONS

"How to Update Bridge Firmware," Nov. 7, 2010, pp. 1-5 [online], PS Audio, Retrieved from the Internet on Jan. 29, 2018 at URL: <psaudio.com/ps_how/how-to-update-bridge-firmware/>.

International Preliminary Report on Patentability received for PCT Patent Application No. PCT/US2015/043026, dated Feb. 8, 2016, 9 pages.

International Search Report and Written Opinion, International Application No. PCT/US2015/043026, dated May 30, 2016, pp. 1-10.

Nr Yeichiel, "An Overview of Link Aggregation and LACP", published by Nir Yechiel's Blog, pp. 1-3, [Retrieved online: https://nyechiel.com/2015/05/01/an-overview-of-link-aggregation-and-lacp/ on Oct. 6, 2021] (Year: 2015).

Virtual networking technologies at the server-network edge—Technology brief, published Nov. 2011, pp. 1-12. Retrieved online Mar. 14, 2019 from [https://cs.nyu.edu/courses/fall14/CSCI-GA.3033-010/Network/SDN.pdf] (Year: 2011).

* cited by examiner

FIRMWARE UPDATE OF AN INTERCONNECT DEVICE

CROSS REFERENCE TO RELATED APPLICATIONS

This application is a continuation application of U.S. application Ser. No. 15/749,032, now U.S. Pat. No. 11,379,208, a U.S. National Phase Application having a filing or 371(c) date of Jan. 30, 2018, which claims priority to PCT Application Number PCT/US2015/043026, filed on Jul. 30, 2015. The entire contents of these applications are hereby incorporated herein by reference.

BACKGROUND

Network interconnect devices are typically provided in various communication networks to facilitate handling of data or information. Such network interconnect devices may include switches or bridges, for example. Various types of network interconnect devices are provided with firmware that includes instructions and controls operation of the devices. The firmware in these devices often requires updating to, for example, correct flaws, improve functionality or maintain compatibility with other network components.

BRIEF DESCRIPTION OF THE DRAWINGS

For a more complete understanding of various examples, reference is now made to the following description taken in connection with the accompanying drawings in which.

DETAILED DESCRIPTION

Figure 1:
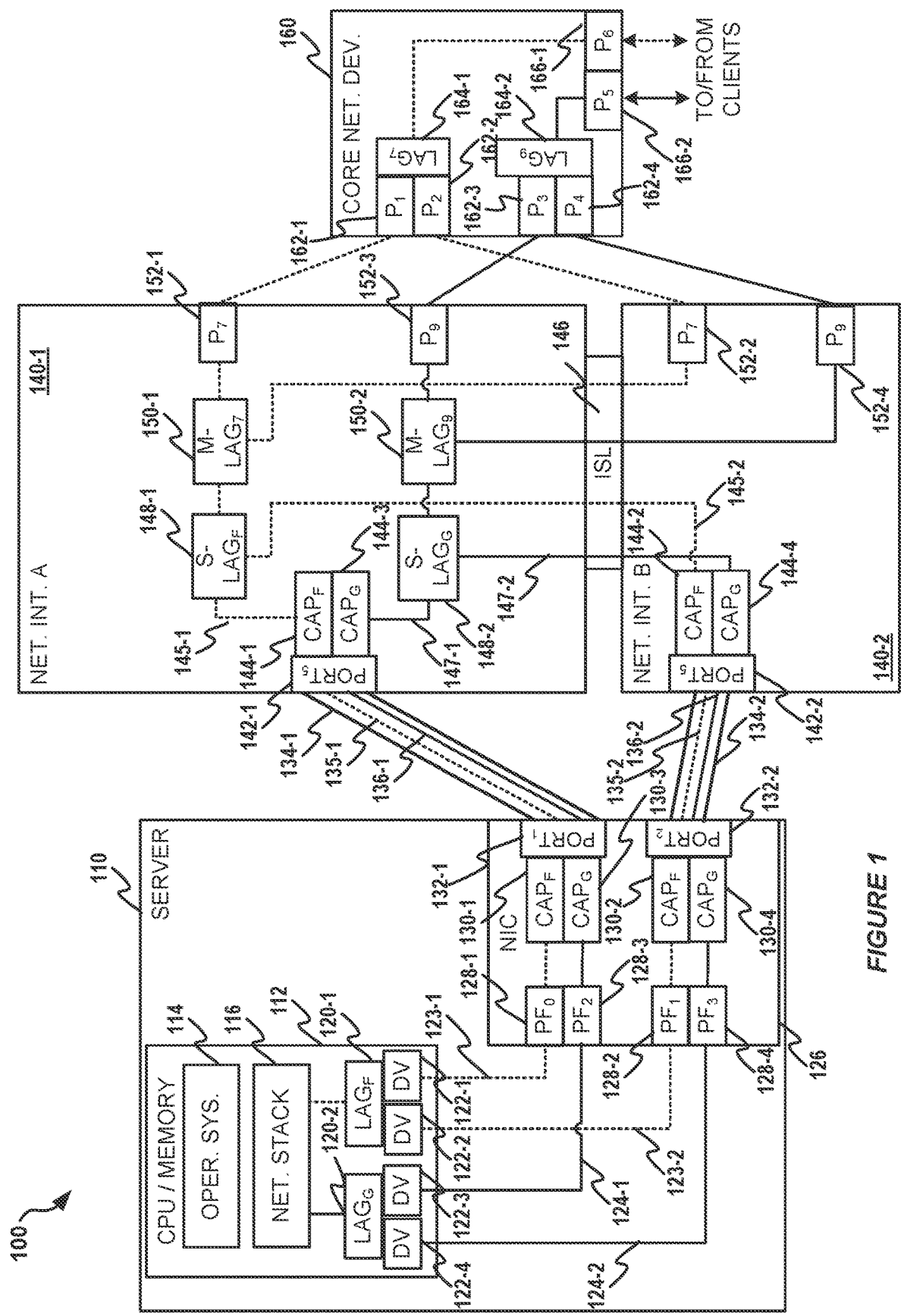
FIG. 1 illustrates an example system for automated firmware update of a complex of network interconnect devices at a server edge without loss of server connectivity.

Updating firmware of network interconnect devices typically requires taking each interconnect device out of service, updating the firmware and restarting each device. However, in some situations, when a first network interconnect device and then a redundant network interconnect device are restarted in quick succession, network connections may not be re-established or may fail to provide continuity of connection. If a link aggregation group (LAG) exists between a network interface card (NIC) of the server and interconnect ports of the network interconnect devices, a Link Aggregation Control Protocol (LACP) entity of the NIC may not have fully reactivated its transmission queues of the link to the updated first network interface device before the second network interface device is restarted. Thus, even though there may be at least one link available to carry traffic, the second network interface device may not be ready to use the link that just recovered, and so the entire LAG behaves as if links to both network interface device have failed at the same time.

Various example systems and methods described herein maintain a network connection of a computing device (e.g., a server) while firmware on a network interconnect device is updated. The network interconnect device, such as a switch or a bridge, may be in a multi-chassis LAG pair of network interconnect devices that are updated. In various example systems, at least two network interconnect devices are connected to at least one server, each server including at least two Network Interface Card (NIC) ports. For each server, one NIC port is linked to one of the network interconnect devices, and a second NIC port is linked to a second network interconnect device. The links may be configured as a redundant pair according to IEEE 802.1AX, using Link Aggregation Control Protocol (LACP) to establish and maintain the redundant connections. A similarly configured set of links connects the two network interconnect devices to a core network device.

In various examples, certain updates to firmware of the network interconnect devices require the network interconnect devices to be restarted in order for the new firmware to begin operation. In these examples, the example system manages the state of the aggregated links and controls the pace and order of the restarts so as to guarantee that at least one link of each redundant connection is available at all times, maintaining the servers' access to the network. An example process uses information about the state of the LACP entity in the servers to determine when a network interconnect device can be safely restarted.

By administratively removing a network interconnect device from the multi-chassis LAG pair before taking it offline, transmission queues can be allowed to drain before taking the network interconnect device offline, ensuring no loss of data. In addition, by monitoring the state of the LACP entity on the server end of the redundant links, the systems and methods ensure that the physical link that was recently taken down has fully recovered before taking down its redundant partner to receive the firmware update.

Referring now to the figures, FIG. 1 illustrates an example system 100 for automated firmware updating of a complex of network interconnect devices at a server edge without loss of server connectivity. The system 100 includes a computing device which, in the example of FIG. 1, is a server 110. In other examples, the computing device may be any of a variety of other devices including but not limited to database appliances, storage appliances or workstations. The server 110 is communicatively coupled to a pair of network interconnect devices including a first network interconnect device 140-1 and a second network interconnect device 140-2. The server 110 is connected to each of the first network interconnect device 140-1 and the second network interconnect device 140-2 via a single physical network media 134-1 and 134-2 (e.g., a cable), respectively. The first and second network interconnect devices 140-1 and 140-2 are each communicatively connected, e.g., via cables, to a core network device 160. The system 100 provides a plurality of redundant multiplexed data connections between the server 110 and the core network device 160.

The example server 110 includes a central processing unit (CPU) 112 and a network interface card (NIC) 126. The CPU 112 includes an operating system component 114 and a network stack component 116. The CPU 112 also includes memory for storing software and/or firmware for implementing the operating system component 114 and the network stack 116. In various examples, the memory may include non-volatile storage including but not limited to at least one of a read-only memory (ROM), programmable flash memory or erasable programmable ROM (EPROM).

In various examples, the memory may be integrally formed with the CPU 112 or may be an external memory device. The network stack component 116 provides for packetized communication between the CPU 112 and the NIC 126. The network stack component 116 may provide various layers including, for example, an application layer, a transport layer, an internet layer and/or a link layer.

In the example of FIG. 1, the network stack component 116 is linked to a first LAG entity 120-1 (labeled $LAG_F$) and a second LAG entity 120-2 (labeled $LAG_G$). The network stack component 116 provides a first data stream to the first LAG entity 120-1 and a second data stream to the second LAG entity 120-2. The LAG entities 120 each coordinate a LAG between the server 110 and one of the first network interconnect devices 140. In the example of FIG. 1, the LAGs between the server 110 and the network interconnect devices 140 each may provide redundant data connections that include the first and second data streams provided by the network stack component 116. These redundant data connections provide for resiliency in transporting the data streams.

The first and second LAG entities 120-1 and 120-2 maintain first and second LAGs between the server 110 and the first and second network devices 140-1 and 140-2 according to the LACP protocol. LACP provides a method to control the bundling of several physical ports together to form a single logical channel. LACP allows the server 110 to negotiate an automatic bundling of links by sending LACP packets to the first and second network interconnect devices 140-1 and 140-2.

The first LAG entity 120-1 is coupled to first and second LACP driver components 122-1 and 122-2. The first and second LACP driver components 122-1 and 122-2 communicate redundant copies of the first data stream from the first LAG entity 120-1 to first and second peripheral component interconnects (PCI)-express physical functions 128-1 and 128-2 (labeled $PF_0$ and $PF_1$, respectively). The first and second PFs 128-1 and 128-2 are also referred to as NIC partitions. Each of the first and second PFs 128-1 and 128-2 modulates the first data stream received from the respective first and second LACP drivers 122-1 and 122-2 over a first portion of bandwidth of the first and second physical network media 134-1 and 134-2. In addition, each of the first and second PFs 128-1 and 128-2 demodulates corresponding data stream received from the first and second network interconnect devices 140-1 and 140-2 and communicates the demodulated data stream to the respective first and second LACP drivers 122-1 and 122-2.

The second LAG entity 120-2 is coupled to third and fourth LACP driver components 122-3 and 122-4. The third and fourth LACP driver components 122-3 and 122-4 communicate redundant copies of the second data stream from the second LAG entity 120-2 to third and fourth PFs 128-3 and 128-4 (labeled $PF_3$ and $PF_4$, respectively). Each of the third and fourth PFs 128-3 and 128-4 modulates the second data stream received from the respective third and fourth LACP drivers 122-3 and 122-4 over a second portion of bandwidth of the first and second physical network media 134-1 and 134-2, the second portion of bandwidth being different from the first portion of bandwidth utilized by the first and second PFs 128-1 and 128-2. In addition, each of the third and fourth PFs 128-3 and 128-4 demodulates a corresponding data stream received from the first and second network interconnect devices 140-1 and 140-2 and communicates the demodulated data stream to the respective third and fourth LACP drivers 122-3 and 122-4.

In various examples, the PFs 128 modulate and demodulate multiplexed data connections according to the edge virtual bridging S-channel standard. The first through fourth PFs 128-1 to 128-4 are each coupled to first through fourth server channel access ports (CAP) 130-1, 130-2, 130-3 and 130-4, respectively. The server CAPs 130 are connected to first and second physical NIC ports 132-1 and 132-2. Specifically, the first and third server CAPs 130-1 and 130-3 are coupled to the first NIC port 132-1 and the second and fourth server CAPs 130-2 and 130-4 are coupled to the second NIC port 132-2. In this way, copies of the first and second data streams are multiplexed and demultiplexed to and from the first and second physical network media 134-1 and 134-2, as indicated by first and second multiplexed channels 135-1 and 136-1, respectively, contained within the first physical network media 134-1, and as indicated by third and fourth multiplexed channels 135-2 and 136-2 contained within the second physical network media 134-2.

The NIC 126 includes a processor (e.g., a CPU) and memory storing software and/or firmware for implementing various components of the PFs 128 and the CAPs 130. In various examples, the memory may include at least one of ROM, programmable flash memory or erasable programmable ROM (EPROM). In various examples, the memory may be integrally formed with the CPU of the NIC 126 or may be an external memory device.

The first and second physical network media 134-1 and 134-2 are each coupled to respective ones of first and second server side network interconnect ports 142-1 and 142-2 included in the first network interconnect device 140-1 and the second network interconnect device 140-2, respectively. The first server side network interconnect port 142-1 is coupled to first and third network interconnect CAPs 144-1 and 144-3. The first and third network interconnect CAPs 144-1 and 144-3 each receives copies of the first and second data streams that are received from and transmitted to the first physical network media 134-1. The second server side network interconnect port 142-2 is coupled to second and fourth network interconnect CAPs 144-2 and 144-4. The second and fourth network interconnect CAPs 144-2 and 144-4 each receives copies of the first and second data streams that are received from and transmitted to the second physical network media 134-2.

The first network interconnect CAP 144-1, of the first network interconnect device 140-1, and the second network interconnect CAP 144-2, of the second network interconnect device 140-2, each communicate a copy of the first multiplexed data stream to and from a first multi-chassis LAG entity 148-1. In this example, the first data stream is one of a pair of edge virtual bridging S-channels and the first multi-chassis LAG entity 148-1 is a multi-chassis LAG of S channels and is thus labeled as $S\text{-}LAG_F$. The first multi-chassis LAG entity 148-1 coordinates with the first server LAG entity 120-1 to complete the LAG containing the first data stream.

In the example of FIG. 1, the first multi-chassis LAG entity 148-1 communicates the combined first data streams to and from a first multi-chassis LAG entity 150-1 that is linked with a corresponding first core network device LAG entity 164-1 in the core network device 160. The combined first data streams are communicated from the first multi-chassis LAG entity 150-1 to first and second core network side network interconnect ports 152-1 and 152-2 of the first and second network interconnect devices 140-1 and 140-2. Each of the first and second network interconnect devices 140-1 and 140-2 communicates a copy of the first data stream to first and second interconnect side core network device ports 162-1 and 162-2 of the core network device 160. The first and second interconnect side core network device ports 162-1 and 162-2 are coupled to the first core network device LAG entity 164-1 so as to complete the core network side LAG of the first data stream. This first data stream may then be communicated to and from various client devices via a first client side core network device port 166-1.

The third network interconnect CAP 144-3, of the first network interconnect device 140-1, and the fourth network interconnect CAP 144-4, of the second network interconnect device 140-2, each communicates a copy of the second multiplexed data stream to and from a second multi-chassis LAG entity 148-2. In this example, the second data stream is one of a pair of edge virtual bridging S-channels and the second multi-chassis LAG entity 148-2 is a multi-chassis LAG of S channels and is thus labeled as S-LAG$_G$. The second multi-chassis LAG entity 148-2 coordinates with the second server LAG entity 120-2 to complete the LAG containing the second data stream.

The second multi-chassis LAG entity 148-2 of S-channels communicates the combined second data streams to and from a second multi-chassis LAG entity 150-2 that is linked with a corresponding second core network device LAG entity 164-2 in the core network device 160. The combined second data streams are communicated from the second multi-chassis LAG entity 150-2 to third and fourth core network side network interconnect ports 152-3 and 152-4 of the first and second network interconnect devices 140-1 and 140-2. Each of the first and second network interconnect devices 140-1 and 140-2 communicates a copy of the second data stream to third and fourth interconnect side core network device ports 162-3 and 162-4 of the core network device 160. The third and fourth interconnect side core network device ports 162-3 and 162-4 are coupled to the second core network device LAG entity 164-2 so as to complete the core network side LAG of the second data stream. This second data stream may then be communicated to and from various client devices via a second client side core network device port 166-1.

The first and second network interconnect device 140-1 and 140-2 communicate via an inter-switch link (ISL) 146. In FIG. 1, the first network interconnect device 140-1 is illustrated as controlling all the LAG entities 148 and 150 and communicating data streams to the second interconnect device 140-2. However, the second interconnect device 140-2 may also include similar LAG entities 148 and 150 as the first network interconnect device so as to perform similar functions and to assume control of the data streams in preparation for taking interconnect device 140-1 out of service. Alternatively, LAG entities 148 and 150 could be distributed across network interconnect devices 140-1 and 140-2.

The components of the system 100 in FIG. 1 may be modified. For example, the network interconnection devices 140, the server 110 and the core network device 160 may include more ports such that more than two physical network media 134 are provided between the server 110 and the network interconnection devices 140, and more than two physical network media are provided between the network interconnection devices 140 and the core network device 160. Further, more than one server 110 may be coupled to the network interconnect devices 140 and more than one core network device 160 may be coupled to the network interconnect devices 140.

Figure 2:
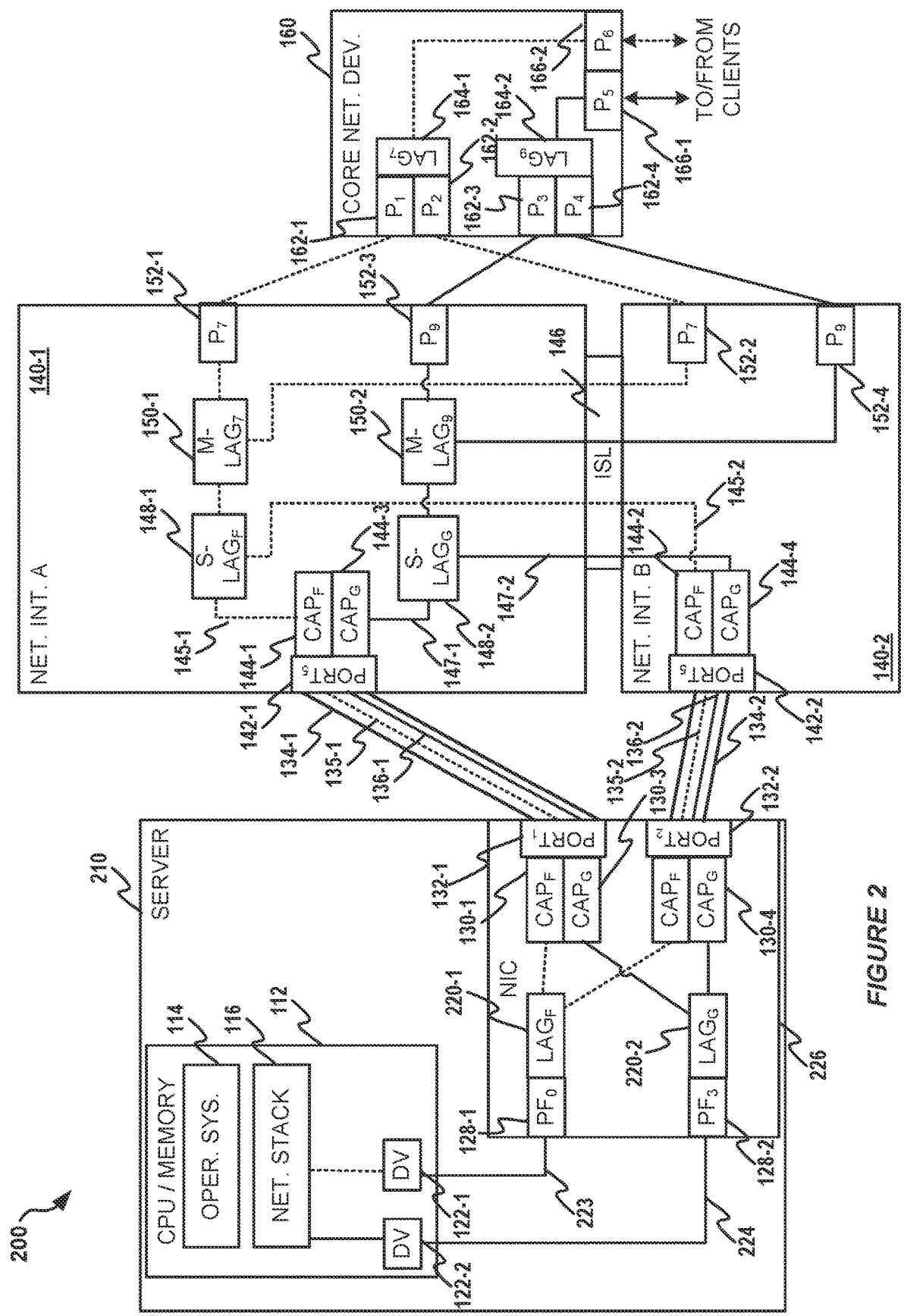
FIG. 2 illustrates another example system for automated firmware update of a complex of network interconnect devices at a server edge without loss of server connectivity.

Referring now to FIG. 2, another example system 200 for automated firmware update of a complex of network interconnect devices at a server edge without loss of server connectivity is illustrated. The network interface devices 140, the core network device 160 and the physical network media 134 are unchanged from the system 100 of FIG. 1. However, the server 210 illustrated in FIG. 2 has been modified from the server 110 of FIG. 1. Specifically, the first and second server LAG entities 120-1 and 120-2 of the server 110 have been replaced with first and second LAG entities 220-1 and 220-2 on a reconfigured NIC 226.

The first data stream is communicated from the network stack 116 to the first PF 128-1 via the first network device driver 122-1. The second data stream is communicated from the network stack 116 to the second PF 228-1 via the second network device driver 122-2. The first PF 228-1 is coupled to the first LAG entity 220-1 and the second PF 228-2 is coupled to the second LAG entity 220-2. The first LAG entity 220-1 communicates first and second versions of the first data stream to and from the first and second CAPs 130-1 and 130-2 and the second LAG entity 220-2 communicates first and second versions of the second data stream to and from the third and fourth CAPs 130-3 and 130-4. The PFs 228 may be implemented on a central processor of the NIC 226. The remaining components of the system 200 function in similar manner to the components of the system 100 of FIG. 1.

Figure 3:
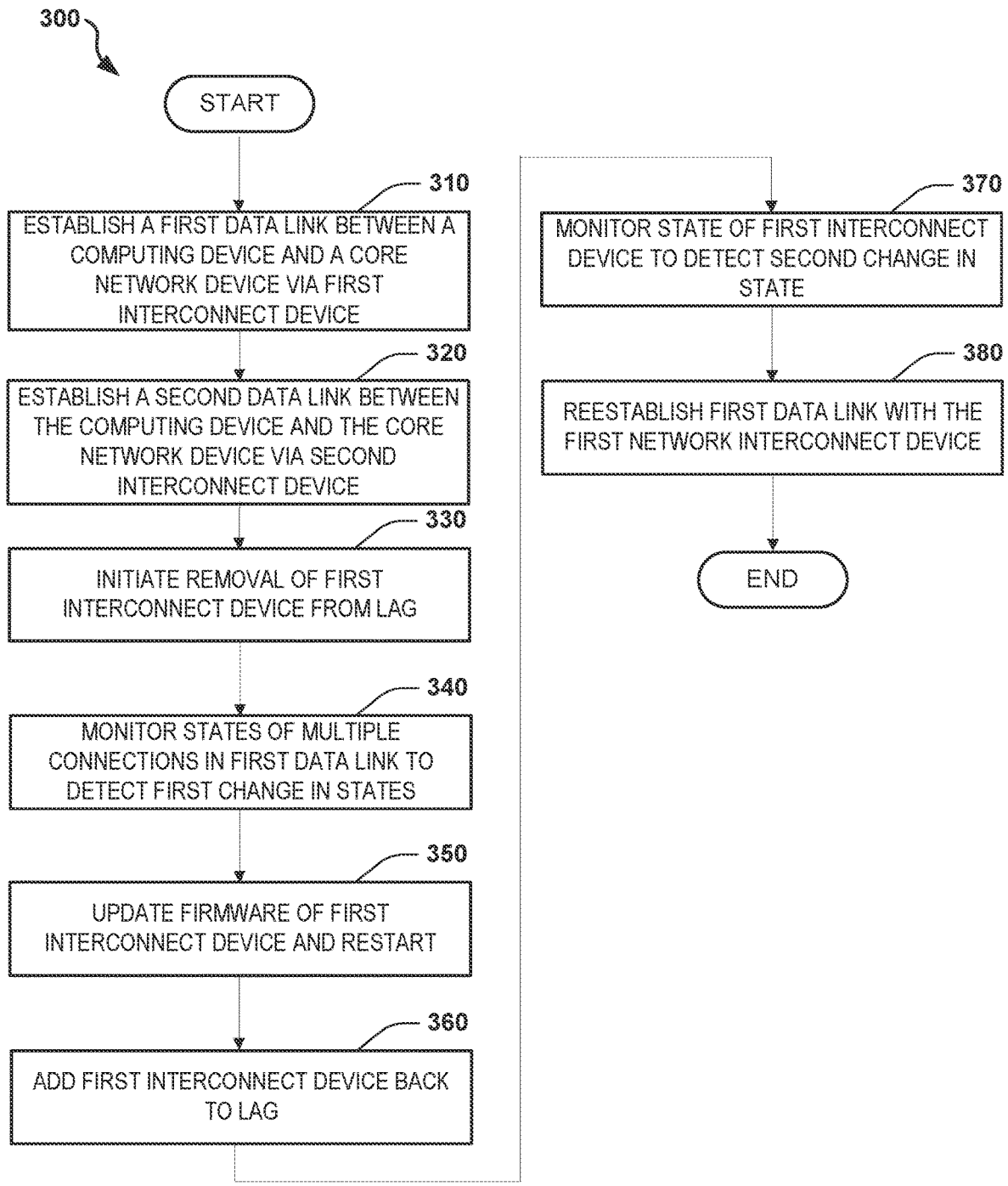
FIG. 3 illustrates an example flow diagram for an example process for automated firmware update of a complex of network interconnect devices at a server edge without loss of server connectivity.

Referring to FIG. 3, an example flow diagram for an example process 300 is illustrated for automated firmware update of a complex of network interconnect devices at a server edge without loss of server connectivity. The process 300 is an example only and may be modified. The example process 300 of FIG. 3 will now be described with further references to FIGS. 1 and 2.

The process 300 may begin with a processor of the server 110 establishing a first data link with the core network device 160 via the first network interconnect device 140-1 connected to the first network interface card (NIC) port 132-1 (block 310). The processor may be located on the CPU 112 and/or on the NIC 226, as illustrated in FIG. 2. At block 320, the processor establishes a second data link with the core network device 160 via the second network interconnect device 140-2 connected to the second NIC port 132-2. In various examples, the first and second data links form a pair of redundant data connections of a link aggregation group (LAG), each of the redundant data connections may include a plurality of multiplexed data connections within one physical network media. For example, the first and second physical network media 134-1 and 134-2 may each include multiplexed S-channels 135-1, 135-2, 136-1 and 136-2.

When an update of firmware of one or both of the network interconnect devices 140 is needed, the processor of the server 110 initiates removal of one of the first or second network interconnect devices from the LAG (block 330). For example, the processor may send an instruction to the first network interconnect device 140-1 instructing the LAG entities 148-1 and 150 to remove all downlink and uplink ports from each of the LAGs formed between the server 110 and the core network device 160. The removal of the first network interconnect device 140-1 takes place while the second network interconnect device 140-2 continues to maintain the second datalink between the server 110 and the core network device 160.

Upon receiving the instruction for removal from the LAGs at block 330, the LACP mechanisms with in the LAG entities 148 and 150 of the first network interconnect device 140-1 transmit LACP frames within egress buffers of the server side interconnect ports 142 and the core network side interconnect ports 152 but schedule no more LACP frames for these ports. In addition, the LAG entities 148 and 150 of the first network interconnect device 140-1 may forward packets bound for the server 110 and the core network device 160 across the ISL 146 to the second interconnect device 140-2 to be transmitted to these devices. Also, the first network interconnect device 140-1 may continue to accept LACP packets from the first NIC port 132-1 allowing transmit buffers/queues of the first NIC port 132-1 to empty before failing over to the second network interconnect device 140-2. At this time, the LAG entities 148 and 150 on the first network interconnect device 140-1 update states on the server side interconnect ports 142 and the core network side interconnect ports 152. LACP agents on the LAG entities 120 or 220 of the server 110, and the LAG entities 164 of the core network device 160, detect the change in state on their ports and likewise remove the corresponding port(s) 162 and 132 from their LACP frame collection and distribution lists.

At block 340, the processor of the server 110 monitors states of the multiplexed data connections 135-1 and 135-2 on the first network interconnect device 140-1 to detect first changes in states indicating that the first network interconnect device 140-1 has stopped receiving or transmitting data to and from the LAG on the plurality of multiplexed data connections. The monitoring process at block 340 may include checks to ensure that: (a) all of the server side interconnect ports 142-2 and core network side interconnect ports 152-2 and 152-4 on the second network interconnect device 140-2 indicate that they their link LAG entities are collecting and distributing LACP frames, and (b) that all of the server side interconnect ports 142-1 and core network side interconnect ports 152-1 and 152-3 on the first network interconnect device 140-1 indicate that they their link LAG entities are not collecting nor distributing LACP frames.

In various examples, the first network interconnect device 140-1 is configured to indicate states of multiple S-Channels per physical network media 134-1. In these examples, the first network interconnect device 140-1 supports independent LACP states per S-Channel, not just per server side interconnect port 142-1. This allows support for Ethernet network adapters that have multiple NIC partitions per port, where each NIC partition has a driver instance operating system 114 and S-Channels to the first network interconnect device 140-1. The first network interconnect device 140-1 and the NIC 126 insert and remove an S-Channel Tag (S-VLAN Tag) for each S-Channel's LACP exchange. Also the first interconnect device 140-1 may support exchange Multi-Chassis LAG states across the ISL 146 for each S-Channel.

Upon determining that the first network interconnect device 140-1 has stopped receiving or transmitting data to and from the LAG on the plurality of multiplexed data connections, the processor updates firmware of the first network interconnect device 140-1 and restarts the first network interconnect device 140-1 upon completing the firmware update (block 350). Alternatively to the processor of the server 110 updating the firmware of the first network interconnect device 140-1, a processor of the first network interconnect device 140-1 may initiate the firmware update and restart the first network interconnect device 140-1.

Upon restarting the first interconnect device 140-1, the processor of the server 110 add the first network interconnect device back to the LAG (block 360). At block 370, the processor monitors a state of the first network interconnect device 140-1 to detect a second change in state of the first network interconnect device 140-1 indicating that the first network interconnect device 140-1 has been added back to the LAG. Upon detecting that the first network interconnect device 140-1 has been added back to the LAG, the processor of the server 110 reestablishes the redundant data connections of the first network interconnect device 140-1 with the core network device 160 (block 380).

Upon completion of the process 300, the process 300 may be repeated to update the firmware on the second network interconnect device 140-2 in a similar fashion. Thus, the process 300 allows for firmware update of both the first and second interconnect devices 140-1 and 140-2 without losing connection of the first and second data streams between the server 110 and the core network device 160.

Figure 4:
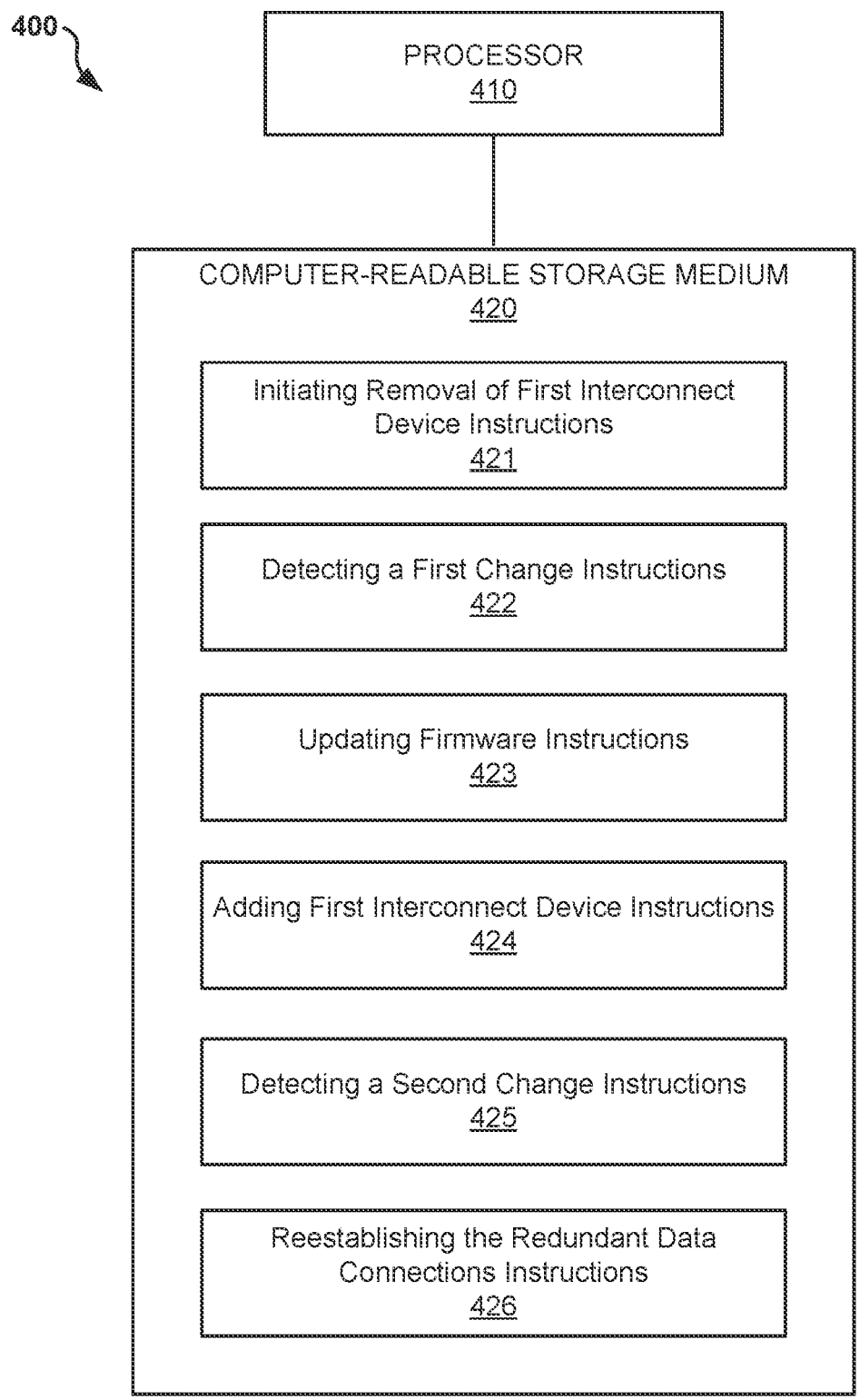
FIG. 4 illustrates a block diagram of an example system with a computer-readable storage medium including instructions executable by a processor to update firmware of an interconnect device.

FIG. 4 illustrates a block diagram of an example system with a computer-readable storage medium including example instructions executable by a processor to update firmware of an interconnect device. The system 400 includes the processor 410 and the computer-readable storage medium 420. The computer-readable storage medium 420 includes example instructions 421-426 executable by the processor 410 to perform various functionalities described herein.

The example instructions includes initiating removal of a first interconnect device instructions 421 to initiate removal of a first network interconnect device forming a first datalink with a core network device while maintaining a second datalink with a second network interconnect device. As described above, the first datalink and the second datalink form a pair of redundant data connections of a LAG, each of the redundant data connections including a plurality of multiplexed data connections within one physical network media.

The example instructions 422 cause the processor 410 to detect a first change in state indicating that the first network interconnect device has stopped receiving or transmitting data to and from the LAG on the plurality of multiplexed data connections. Upon detection of the first change in state, the example instructions 423 cause the processor 410 to update firmware of the first network interconnect device.

The example instructions 424 cause the processor 410 to add the first network interconnect device back to the LAG. The example instructions 425 then cause the processor 410 to detect a second change in state indicating that the first network interconnect device has been added back to the LAG. Upon detecting the second change, the example instructions 426 cause the processor 410 to reestablish the redundant data connections of the first network interconnect device with the core network device.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A computing device comprising:
   a processor; and
   a network interface card (NIC) comprising:
      a first NIC port;
      a second NIC port;
      a first NIC partition coupled to the first NIC port and to a first link aggregation group (LAG) entity coordinating a LAG between the computing device and a first network interconnect device, and
      a second NIC partition coupled to the second NIC port and to a second LAG entity coordinating the LAG between the computing device and a second network interconnect device;
   wherein the processor is configured to:
   detect a first change in state indicating that the first network interconnect device has stopped receiving and transmitting data to and from the LAG on a plurality of multiplexed data connections between the computing device and a core network device, wherein the first change in state is detected through monitoring when both:
   link LAG entities corresponding to a second server-side interconnect port and a plurality of second core network side interconnect ports on the second network interconnect device are collecting or distributing link access control protocol (LACP) frames, the second server-side interconnect port linked to the second NIC port by a second physical network media, and
   link LAG entities corresponding to a first server-side interconnect port and a plurality of first core network side interconnect ports on the first network interconnect device are not collecting or distributing link access control protocol (LACP) frames, the first server-side interconnect port linked to the first NIC port by a first physical network media, the first physical network media being different from the second physical network media; and
   update firmware of the first network interconnect device in response to the first change in state.

2. The computing device of claim 1, wherein the processor is located on the NIC.

3. The computing device of claim 1, wherein after removal of the first network interconnect device from the LAG, the LAG entities of the first network interconnect device transmit LACP frames within egress buffers of the first server-side interconnect port and the first core network side interconnect ports, but schedule no more LACP frames for those ports on the first network interconnect device.

4. The computing device of claim 1, wherein after removal of the first network interconnect device from the LAG, the first network interconnect device transmits LACP frames bound for the computing device or the core network device via an inter-switch link (ISL) to the second network interconnect device.

5. The computing device of claim 1, wherein after removal of the first network interconnect device from the LAG, the first network interconnect device continues to accept LACP packets from the first NIC port of the NIC until transmit buffers of the first NIC port are empty.

6. The computing device of claim 1, wherein the first and second network interconnect devices comprise a multi-chassis LAG pair of network interconnect devices.

7. The computing device of claim 1, wherein the processor comprises a network stack component.

8. The computing device of claim 7, wherein the network stack component is linked to the first LAG entity and the second LAG entity.

9. The computing device of claim 1, wherein the first physical network media is a first cable and the second physical network media is a second cable.

10. A method comprising:
    detecting a first change in state indicating that a first network interconnect device from a link aggregation group (LAG) has stopped receiving and transmitting data to and from the LAG on a first data link between a computing device and a core network device while a second network interconnect device is receiving and transmitting data to and from the LAG on a second data link, wherein the first change in state is detected through monitoring when both:
    link LAG entities corresponding to a second server-side interconnect port and a plurality of second core network side interconnect ports on the second network interconnect device are collecting or distributing link access control protocol (LACP) frames, the second server-side interconnect port linked to a second network interface card (NIC) port of the computing device by a second cable, and
    link LAG entities corresponding to a first server-side interconnect port and a plurality of first core network side interconnect ports on the first network interconnect device are not collecting or distributing link access control protocol (LACP) frames, the first server-side interconnect port linked to a first NIC port of the computing device by a first cable, the first cable being different from the second cable; and
    updating firmware of the first network interconnect device in response to the first change in state.

11. The method of claim 10, further comprising:
    after completing the firmware update, adding the first network interconnect device back to the LAG;
    detecting a second change in state indicating that the first network interconnect device has been added back to the LAG; and
    reestablishing redundant data connections of the first network interconnect device between the computing device and the core network device, wherein the first and second data links are configured as a redundant pair using LACP to maintain the redundant data connections.

12. The method of claim 10, wherein the first and second data links are configured as a redundant pair using LACP to maintain redundant connections.

13. The method of claim 10, wherein the first and second network interconnect devices comprise a multi-chassis LAG pair of network interconnect devices.

14. A non-transitory computer-readable medium encoded with instructions, which when executed by a processor of a computing device, cause the processor to:
  detect a first change in state indicating that a first network interconnect device has stopped receiving and transmitting data to and from a link aggregation group (LAG) on a first plurality of multiplexed data connections while a second network interconnect device receives and transmits data to and from the LAG on a second plurality of multiplexed data connections, wherein the first network interconnect device and the second network interconnect device are each external to the computing device, and wherein the first change in state is detected through monitoring the first plurality of multiplexed data connections to determine whether:
  LAG entities associated with the first network interconnect device
    are coordinating the LAG, and
    are collecting or distributing link access control protocol (LACP) frames that control the LAG; and
  update firmware of the first network interconnect device in response to the first change in state.

15. The non-transitory computer-readable medium of claim 14, further encoded with instructions, which when executed by the processor of the computing device, cause the processor to:
  add the first network interconnect device back to the LAG after updating the firmware;
  detect a second change in state of the first network interconnect device through monitoring when the first network interconnect device is added back to the LAG; and
  after detecting the second change in state, reestablish transmitting and receiving data on the first plurality of multiplexed data connections of the first network interconnect device.

16. The non-transitory computer-readable medium of claim 14, wherein the computing device comprises a network interface card (NIC) having at least two network interface card (NIC) ports, wherein a first NIC port is linked to the first network interconnect device and a second NIC port is linked to the second network interconnect device.

17. The non-transitory computer-readable medium of claim 14, wherein the first and second network interconnect devices are configured as a redundant pair according to LACP.

18. The non-transitory computer-readable medium of claim 14, wherein the first and second network interconnect devices comprise a multi-chassis LAG pair of network interconnect devices.

19. The non-transitory computer-readable medium of claim 14, wherein the computing device further comprises a network stack component linked to a first LAG entity and a second LAG entity.

20. The non-transitory computer-readable medium of claim 19, wherein the first and second LAG entities are each coupled to one or more LACP driver components.

* * * * *